Feb. 3, 1970    D. A. PORTER    3,493,776
DC SHUNT STARTER GENERATOR
Filed July 14, 1966

INVENTOR.
DENNIS A. PORTER
BY
HIS ATTORNEY

United States Patent Office 3,493,776
Patented Feb. 3, 1970

3,493,776
DC SHUNT STARTER GENERATOR
Dennis A. Porter, Crimora, Va., assignor to General
Electric Company, a corporation of New York
Filed July 14, 1966, Ser. No. 565,240
Int. Cl. F02n 11/04
U.S. Cl. 290—31                                  6 Claims

ABSTRACT OF THE DISCLOSURE

A shunt starter generator is modified to provide the starting characteristics of a series starter generator, by weakening the field by paralleling the series compensating winding with a Zener reference diode in the voltage regulator to effect interruption of the excitation as the armature current falls, thereby allowing the field current to decrease to reduce the back EMF. When the back EMF is reduced, the supply voltage exceeds such back EMF and the armature current and resultant current increase, to provide the high speeds required to ignite and start a jet engine.

---

Figure 1:
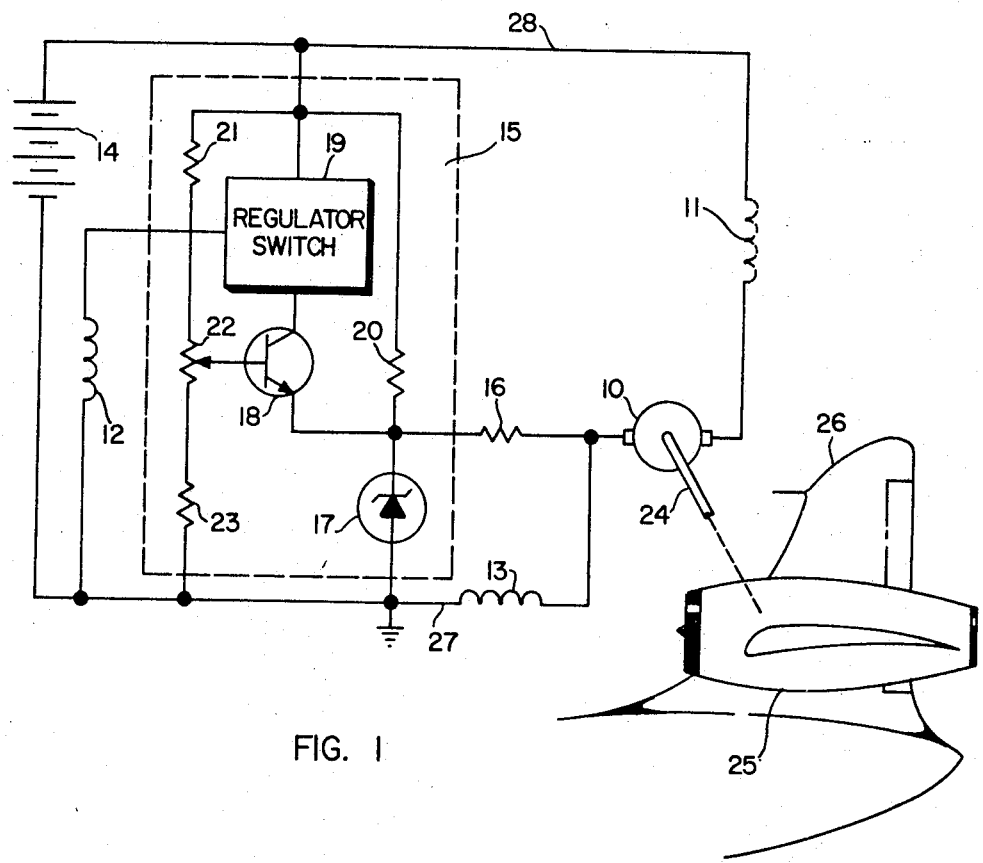

The present invention relates to control circuits for DC starter generators and in particular to a control circuit for causing a shunt field DC starter generator to simulate the starting characteristics of a series field DC starter generator.

Small jet engines are started by the use of a motor generator in which the dynamoelectric machine motors the jet engine up to the proper speed and then is driven as a generator by the engine at normal engine operating speeds. For this purpose, it is common to use a starter generator having both shunt and series fields with the series field providing the torque necessary at the high speeds for starting the engine and the shunt field used when the machine is in its generator mode of operation. The two field windings have been thought necessary since at the time of the conversion from motor to generator operation the direction of the armature current flow reverses which reverses the polarity of the voltage across the series field causing an immediate collapse of this voltage and in turn a collapse of the generator output voltage. It is thus necessary to disconnect the series field when the motoring mode of operation ends. For this purpose a relay or a contactor is normally employed which may sense this impending change of status and appropriately remove the series field.

If the shunt winding in such a starter generator could be made to act like a series winding, that is, to produce torque at high speeds, such as is necessary to start a jet engine, for example, the cumbersome and expensive contactor and the series field could be eliminated. To duplicate the performance of a series field, it has been found that it is necessary only to forestall the point at which the motor ceases to deliver torque to the load, viz, at which time it becomes a generator. Or, in other words, it is necessary only to increase the speed at which torque is still delivered to the load.

It is contemplated that with a reduction in the back electromotive force generated in the armature, the voltage source driving the motor will then exceed the back electromotive force and will supply current to the armature to maintain a torque output. The reduction of the back electromotive force may be accomplished by weakening the normally constant field excitation by making the voltage to the armature appear higher to the regulator than it actually is. Instead of raising the voltage that is sensed, the reference voltage is lowered by applying a voltage across it which is proportional to the armature current flowing and thus as the armature current tends to fall, the reference voltage is lowered causing the regulator to interrupt the current to the field. This loss of excitation lowers the back electromotive force allowing armature current to be applied to the machine again.

It is accordingly an object of the present invention to provide a shunt field DC starter generator capable of simulating the starting characteristics of a series field DC starter generator.

Another object of the present invention is to provide a motor generator in which torque is sustained at high speeds by sensing armature current to reduce the back electromotive force.

A further object of this invention is to provide a shunt DC starter generator having the starting characteristics of a series DC starter generator in which a voltage proportional to armature current adjusts the reference voltage in the voltage regulator to provide a field weakening condition to sustain armature current and torque output.

Figure 2:
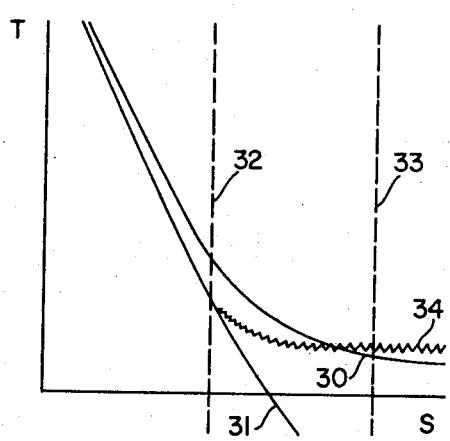

Other objects and advantages of this invention will become more apparent from an analysis of an illustrative embodiment of the invention as shown in the drawings, in which FIGURE 1 shows a portion of a shunt field starter generator circuit in position to start a jet engine, and FIGURE 2 is a plot of torque vs speed for shunt field and series field DC starter generators.

The DC brush type starter generator shown in FIGURE 1 includes an armature 10, a series winding 11, a shunt winding 12 and a series compensating winding 13. This series compensating winding may include a pole face winding which serves to reduce the reactance of the main field, and/or a commutating winding which shifts the neutral plane of the DC field to reduce commutation arcing, and/or an additive field winding to compensate for flux fall-off. Since each of these corrective windings are in series with the armature, the term series compensating winding is adopted to be inclusive of all such windings.

It is noted that the series winding 11 is shown in dashed lines only to indicate its position in the circuit and to emphasize that the series winding is done away with by the present invention. The starter generator is shown coupled by a shaft 24 to a typical load, jet engine 25, which is shown affixed to the tail section of an airplane 26. The shunt winding 12 is coupled across the armature by regulator 15 and in particular by the switch of the regulator 19. Across the armature is also the source of energy which may be a battery 14 serving to power the starter generator during the startup phase of operation.

FIGURE 1 shows a portion of the regular 15 in greater detail as including a sensing circuit voltage divider consisting of resistors 21, 22, and 23 coupled between ground 27 and the high side of the output line 28. The voltage appearing at the wiper of variable resistor 22 is applied to the base of transistor 18, the emitter of which is connected to a Zener diode 17. Regulator switch 19 is controlled by transistor 18. The collector of this transistor is coupled to switch 19. Whenever the voltage on the output line 28 exceeds the predetermined value, the voltage on the base of transistor 18 in proportion thereto will exceed the reference voltage set by Zener diode 17 so that transistor 18 begins to conduct. With the conduction of this transistor, the regulator switch is opened and current is no longer applied to the shunt field 12.

During the motor phase of the starter generator operation, the voltage applied by the battery is normally less than the regulated generator voltage during the generator phase of the operation and therefore, sensing a low armature voltage, the voltage regulator 15 continuously couples the shunt field 12 to the output line 28 so that energization is constantly applied. Under these conditions, the normal characteristic operation of a shunt motor is realized and as the speed is increased, the torque output falls off substantially linearly as shown by curve 31 in FIGURE 2 until it becomes zero at a speed well below that required to properly start a jet engine. This starting speed is indicated by dashed line 33 in the figure. Curve 30 shows the associated characteristic for a series motor and indicates that at a speed sufficient to start the jet engine, positive torque is still delivered to the engine.

Dashed line 32 in FIGURE 2 indicates the speed at which the jet engine is said to light off or ignite. Such engines require that the starting speed which is substantially the idling speed of the engine be reached as quickly as possible after the engine has lighted off since the heat can become intense when the speed is not sufficient for proper cooling. This requires that the jet engine be motored to starting speed at quickly as possible once light-off has been achieved. It is thus apparent that if a shunt motor is used to drive the jet engine from light-off to starting speed that the torque output must be maintained beyond he speed at which the motor normally becomes a generator.

When the torque output of the starter generator falls to zero and the machine is ready to start generating, the relationship between the applied voltage and the generated voltage (the back electromotive force of the armature) is that the generated voltage has built up until it is substantially equal to the applied voltage and thus there is no longer clockwise current flow from the battery 14 to the armature 10. If the machine can be prevented from reaching this stalemate condition, the motor status of the machine can be maintained. Thus, if the back electromotive force can be reduced, armature current will continue to flow from the battery 14 and the machine will continue to deliver torque to drive the jet engine. The relationships between the speed, armature current, torque and electromotive force of a motor show also that for a given armature current, by reducing the field current, the speed of the machine is increased. These relationships are readily seen from the following equations:

$$V_{EMF}=k_1\phi S \quad (1)$$

where $V_{EMF}$ is the back electromotive force of the machine; $\phi$ is the flux in the field, S is the speed of the machine, and $k_1$ is a constant of the machine. Since $$\phi=k_2 I_f \quad (2)$$

where $I_f$ is the field current and $k_2$ is another machine constant indicating the relationship between flux and current, Equation 3 then becomes by substituting for $\phi$ $$V_{EMF}=k_3 I_f S \quad (3)$$

where $k_3$ supplants $k_1 k_2$. By summing the voltage drops around the power loop, it is seen that the terminal voltage is equal to the brush drop plus the drop in the armature plus the back electromotive force:

$$V_T = BD + I_A R_A + V_{EMF} \quad (4)$$

where $V_T$ is the terminal or battery voltage, BD is the brush drop, $I_A$ is the armature current, $R_A$ is the armature resistance and $V_{EMF}$ is the back electromotive force. Solving for $I_A$ in Equation 4 and substituting for $V_{EMF}$, we obtain $$I_A = \frac{V_T - k_3 I_f S - BD}{R_A} \quad (5)$$

It can be seen by observing this equation that when $V_T - BD = k_3 I_f S$ the numerator on the right and $I_A$ equals zero. This is the situation that occurs at the transition between the motor and generator phase of operation.

By using the equations and recapitulating, it is seen by observing Equation 3 that by lowering the field current, the back electromotive force is lowered. Noting Equation 5, when the back electromotive force ($k_3 I_f S$) is lowered, the armature current goes up. Since the current flowing into the machine is proportional to the torque that is produced, then, for a given speed when the field current is lowered, the torque goes up, or, for a given torque or armature current, considering brush drop constant as is the applied voltage and the armature resistance, with lowered field current, the speed goes up. Thus it is seen that if it is desired to maintain a constant torque with increasing speeds or a higher torque for the same speed, the reduction of the field current is necessary.

Accordingly, referring to FIGURE 1, there is shown a resistor 16 coupling the series compensating winding 13 across the Zener diode 17. The value of resistor 16 is selected with regard to the value of the voltage across the compensating winding at which it is desired to lower the Zener voltage and with regard to the value of resistor 20, through which current normally flows to the voltage reference. Since winding 13 is in series with the armature, the voltage developed thereacross is proportional to the armature current. So long as the voltage across the compensating winding remains above a predetermined value which may be the Zener voltage or a selected lower value, this voltage source will supply current to the Zener to maintain the reference voltage at its normal level. When the voltage across winding 13 falls below the selected value, current is no longer suppied via resistor 16 to the Zener diode and a portion of the current from resistor 20 begins to flow through resistor 16 and winding 13 to ground. Thus the current that is needed to maintain this reference at a constant voltage is no longer available and the Zener voltage accordingly falls.

With a lowering of the voltage at the emitter of transistor 18, this switching device begins to conduct which in turn causes the regulator switch 19 to open. The discontinuance of voltage applied to the field and the subsequent decay of field current causes the back electromotive force to be lowered, as seen in Equation 3, which in turn causes the armature current and the proportional torque generated to rise as is noted in Equation 5.

Again returning to FIGURE 2, curve 34 shows a shunt motor torque speed characteristic which is equal to or better than that of a series motor. This jagged or saw-toothed modification of the characteristic shown by curve 31 represents the fact that with the decay of field current, the armature current will rise until the voltage across the winding 13 is such that current is again applied from this source to the Zener diode so that this reference returns to its nominal value turning off transistor 18 which inturn allows regulator switch 19 to again apply voltage to the field. With the application of voltage to the field so that field current increases, Equation 3 shows that the back electromotive force increases so that the difference between the generated voltage and the applied voltage becomes less and armature current again falls to precipitate a repetition in the corrective cycle. The saw-toothed curve thus reflects the rapid change in the Zener voltage when the armature current has fallen sufficiently to control the current flow through this reference diode.

It should be pointed out that at low speeds the shunt motor and series motor have substantially the same torque-speed characteristic, noting curves 30, 31 to the left of dashed line 32 in FIGURE 2. Thus, it is only at the higher motoring speeds and beyond the speed at which generator action takes over that field weakening is necessary. Since armature current and torque have the same speed response, it is only at high speeds that the armature current and thus the voltage across the compensating winding falls enough to effect a lowering of the reference voltage to turn off the field current.

It is to be noted that curves 30 and 31 in FIGURE 2 could readily be for the same motor, curve 30 representing the starting characteristic with a series field and curve 31 showing the starting characteristic without the aid of a series field.

While a single embodiment of applicant's invention has been shown to illustrate the principle of simulating the torque speed curve of a series field regulated DC starter generator with a shunt field regulated DC starter generator, it is the principles illustrated and not the particular structure used by way of description which constitutes the subject of this invention. It is noted that resistor 16 only serves to establish the desired proportionality between the voltage applied from winding 13 and that applied from the output lead via resistor 20 and to limit the current flow to the Zener. Where there is sufficient impedance in the series compensating winding and where the relation between the armature voltage and current is such, resistor 16 may not be a necessary part of the voltage divider. A diode may as readily limit the current applied to the Zener from this path. Thus, this resistor may be considered together with the series compensating winding as an impedance for applying a voltage across the reference which is proportional to armature current to control the value of the reference voltage so long as the armature current is below a predetermined value. Also, since compensating windings are normally to be found in motor generators, this element provides a ready means for establishing a voltage proportional to armature current. It should be understood, however, that other means to establish such a voltage may be readily substituted for the compensating winding. A resistor of the appropriate value or a series winding, for example, might be used. The foregoing description should accordingly be taken primarily by way of illustration and not in limitation except as may be required by the appended claims.

What I claim as new and desire to secure by Letters Patent of the United States is:

1. A starter generator, comprising:
   a shunt field winding;
   a series compensating winding for developing a voltage which is proportional to the armature current;
   a voltage regulator including a voltage reference for controlling the voltage applied to said shunt field winding;
   impedance means for coupling said series compensating winding across said voltage reference of said voltage regulator, whereby to decrease the voltage across said voltage reference in response to a decrease in the armature current, which decrease occurs at high starting speeds and at speeds beyond the speed at which such generator would otherwise revert to the generator made due to the armature current being below a predetermined value, so as to preclude said voltage regulator from applying voltage to said shunt field winding to thereby reduce the back electromotive force of said generator, thereby increasing the armature current and sustaining the torque of said generator.

2. A starter generator, comprising:
   first and second power conductors;
   an armature and a first impedance coupled in series to and between said first and second power conductors, and having a junction therebetween;
   a shunt field winding and a regulator switch coupled in series to and between said first and second power conductors;
   control means for controlling the operation of said regulator switch including:
   a second impedance and a constant voltage drop means coupled in series to and between said first and second power conductors, and having a reference voltage terminal therebetween;
   a voltage sensitive switching means coupled to and between said regulator switch and said reference voltage terminal, and so arranged as to maintain said regulator switch closed when the voltage at said reference voltage terminal is above a predetermined voltage and to open said regulator switch when the voltage at said reference voltage terminal is below said predetermined voltage;
   a third impedance coupled to and between said armature junction and said reference voltage terminal, and so arranged that when the current through said armature and said first impedance falls below a predetermined value, to bring the voltage at said armature junction below the voltage at said reference voltage terminal, to lower the voltage at said reference voltage terminal below said predetermined voltage;
   whereby, said voltage sensitive switching means opens said regulator switch, causing a decay of field current, causing a lowering of back electromotive force, causing an increase in armature current, causing an increase in armature torque.

3. A starter generator according to claim 1 wherein: said first impedance is a series compensation winding.

4. A starter generator according to claim 1 wherein: said voltage sensitive switching means is a transistor having its emitter coupled to said reference voltage terminal and conducting when the voltage at said reference voltage terminal falls below said predetermined voltage, to open said regulator switch.

5. A starter generator according to claim 1 wherein: said constant voltage drop means is a Zener diode.

6. A starter generator according to claim 4 wherein: said third impedance is a resistor.

References Cited

UNITED STATES PATENTS

| | | | |
|---|---|---|---|
| 2,802,977 | 8/1957 | Harvey et al. | 318—338 |
| 2,929,975 | 3/1960 | Caldwell et al. | 318—154 |
| 3,148,318 | 9/1964 | Bradburn et al. | 318—154 |
| 3,183,427 | 5/1965 | Hawkins et al. | 318—154 XR |
| 3,211,983 | 10/1965 | Dolphin | 318—338 |
| 3,219,900 | 11/1965 | Wilkerson | 318—338 |
| 3,221,173 | 11/1965 | Hoover | 290—46 XR |
| 3,270,207 | 8/1966 | Stockton | 290—46 XR |
| 3,378,746 | 4/1968 | Weiser | 318—338 XR |

ORIS L. RADER, Primary Examiner

G. R. SIMMONS, Assistant Examiner

U.S. Cl. X.R.

290—46; 318—154, 338, 430